(12) United States Patent
Flinta et al.

(10) Patent No.: US 8,817,800 B2
(45) Date of Patent: Aug. 26, 2014

(54) GATEWAY WITH HTTP PROCESSING

(75) Inventors: Christofer Flinta, Stockholm (SE); Jans-Erik Mangs, Solna (SE); Bob Melander, Sigtuna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 440 days.

(21) Appl. No.: 13/127,631

(22) PCT Filed: Nov. 14, 2008

(86) PCT No.: PCT/SE2008/051314
§ 371 (c)(1),
(2), (4) Date: May 4, 2011

(87) PCT Pub. No.: WO2010/056169
PCT Pub. Date: May 20, 2010

(65) Prior Publication Data
US 2011/0211588 A1   Sep. 1, 2011

(51) Int. Cl.
*H04L 12/28*    (2006.01)
*H04L 12/56*    (2006.01)

(52) U.S. Cl.
USPC ............................................ 370/401; 370/400

(58) Field of Classification Search
None
See application file for complete search history.

(56) References Cited

U.S. PATENT DOCUMENTS

| 2006/0085547 | A1 | 4/2006 | Cormier | |
| 2006/0239254 | A1* | 10/2006 | Short et al. | 370/352 |
| 2007/0153812 | A1* | 7/2007 | Kemp | 370/401 |
| 2009/0201936 | A1* | 8/2009 | Dumet et al. | 370/401 |

* cited by examiner

*Primary Examiner* — Ayaz Sheikh
*Assistant Examiner* — Blanche Wong

(57) ABSTRACT

Embodiments of the present invention relate to an apparatus and method for providing an end user of a network terminal in a local network with an access link to an external network. According to an embodiment of the present invention, a network node further includes a control unit arranged to transmit a local hypertext transfer protocol (HTTP) response including detailed information to at least one network terminal in said local network using an earlier original HTTP request towards said external network made by said at least one network terminal in the local network.

15 Claims, 4 Drawing Sheets

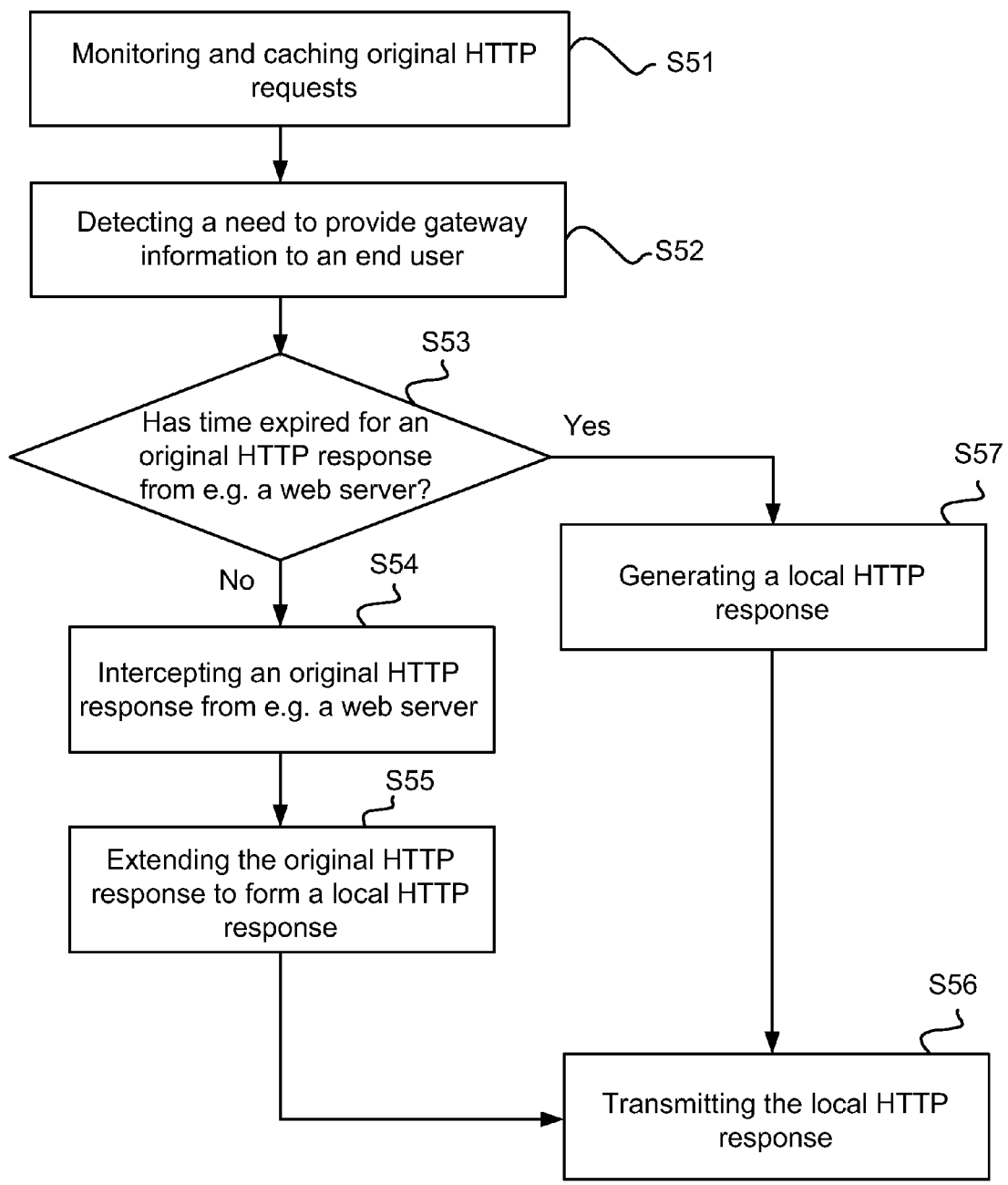

GATEWAY WITH HTTP PROCESSING

BACKGROUND

A network node as referred to herein may be implemented in various types of network environments such as in company networks, office networks, residential networks, etc., for providing access to external networks, such as, the Internet or other interconnecting networks. However, the functionality of the network node may most fittingly be described in reference to a residential gateway implemented in a residential network.

A residential gateway is a kind of network equipment found in most homes today. The residential gateway, also referred to as home gateway, is a hardware device connecting a home network to external networks, for example, a wide area network (WAN) such as the Internet.

A residential gateway may combine the functions of an IP router, multi-port Ethernet switch and WiFi access point. It may also provide port translation functionality (NAT), support for localized Quality of Service (QoS) enforcement and also serves as a dynamic DNS client, etc. The residential gateway may be arranged between a modem and the residential network, or an xDSL or cable modem may be integrated into the residential gateway. Thus, the residential gateway has a connection, such as, an Ethernet connection or xDSL connection, which it may use to connect to the external networks, WANs or the Internet.

Physically, a residential gateway is usually provided with a few simple lights, for example, LEDs, in order to indicate the status of the gateway to a user of a network terminal in the residential network. These may indicate, for example, if the gateway is turned on/off, whether a DSL link has been established or not, or whether the IP address configuration to an external network has succeeded or not. In this way, the residential gateway may automatically only convey a restricted amount of information using very limited means.

Furthermore, a residential gateway typically provides an interface to its configuration, settings and other status information. This may be performed by running a local web server. The local web server provides a web page comprising said gateway information. A skilled user may access the web page by typing in the numerical IP address of the residential gateway in an address field of a web browser. However, this requires knowledge about the numerical IP address of the residential gateway, and a general knowledge about how a residential network and a residential gateway operate in order to interpret the gateway settings and configurations displayed on the web site. It also requires that the user of the network terminal actively searches for this information.

SUMMARY

A problem to which the invention relates is the problem of conveying detailed information to an unskilled user of a network terminal.

The invention relates to a network node arranged to provide an end user of a network terminal in a local network with an access link to an external network, said network node being arranged to be connected between said local network and said external network, characterized in that said network node comprises a control unit arranged to transmit a local hypertext transfer protocol (HTTP) response comprising detailed information to at least one network terminal in said local network using an earlier original HTTP request towards said external network made by said at least one network terminal in the local network.

The invention also relates to by a method for use in a network node providing an end user of a network terminal in a local network with an access link to an external network, said network node is arranged to be connected between said local network and said external network, characterized by the step of: transmitting a local HTTP response comprising detailed information to at least one of said network terminals in said local network from said network node using an original HTTP request towards said external network made by at least one of said network terminals in the local network.

The invention further relates to a computer program product for use in a network node in a local network, which comprises computer readable code means, which when run in a control unit in the network node causes said control unit to perform the step of: transmitting a local HTTP response comprising said detailed information to at least one of said network terminals in said local network using an earlier original HTTP request towards an external network made by at least one of said network terminals in the local network.

A lot of the data traffic between the network terminals in the local network and the external network is typically web traffic, that is, data traffic following the request/response standard according to the hypertext transfer protocol (HTTP). All of this data traffic will inevitably pass through the network node, in both the uplink and downlink direction, on its way between the network terminals and the external network. A network node arranged according to the above opens up a completely new information channel for the network node to the user of the network terminals. Thus, using this information channel enables the network node to automatically provide an unskilled user with a large amount of detailed information.

The control unit may further be arranged to generate the local HTTP response in response to detecting a need to provide the detailed information to an end user of a network terminal in the local network. This enables, for example, the network node to convey detailed information about the network node to a user of a network terminal without requiring that a numerical IP address for the network node is entered in a web browser. The need to provide the detailed information may be detected in the control unit, for example, by the timing expiry of an original HTTP response from an external web server, and the detailed information may comprise information to the end user indicating that said original HTTP response has timed out. This enables, for example, the network node to notify the user that an original HTTP response from an external web server has timed out.

The local HTTP response may be generated such that the contents of the TCP/IP headers in the local HTTP response are such that the TCP/IP layers of the network terminals accept the local HTTP response. This may be performed by, for example, having the control unit arranged to monitor and cache at least one original HTTP request in order to be able to forge the contents of the TCP/IP headers in the local HTTP response such that the TCP/IP layers on the network terminals accepts said local HTTP response. Alternatively, the control unit may be arranged to intercept an original HTTP response from an external web server to the earlier original HTTP request made by at least one of said network terminals in the local network, and extend the original HTTP response so as to form the local HTTP response. The intercept may also be performed by the control unit in response to a detected need to provide the detailed information to an end user of a network terminal in the local network. The features mentioned above provide the advantage of allowing the network node to automatically convey detailed information that previously has not been available to the user of the network terminal. Such detailed information may be, for example, live warnings or error messages, current information about the number of ongoing sessions, or information about the current performance of the internet provider's network, new downloadable software, the amount of available memory space in the network node, etc.

Additionally, the original HTTP response may be extended by an HTML frame or banner when creating the local HTTP response. This may be performed such that the local HTTP response when presented, by a web browser in the networks terminal, to an end user clearly separates the original HTTP response from the detailed information provided by the network node. Alternatively, the local HTTP response comprising the detailed information may be generated by the control unit such that it is rendered obvious to the end user that it is the network node that has generated the local HTTP response. Thus, by using this direct information channel, that is, using existing web traffic to convey detailed information, the network node is able to achieve a direct response from a user. This is because a user of the network terminal, which is currently running a web browser and generating web traffic, will be presented with the detailed information from the network node in the active window of the web browser during use. For example, by a banner or HTML frame as mentioned above. It follows that the attention of the user immediately will be drawn to the detailed information.

A further advantage of the above described invention is that it only adds minor data traffic in the local network between the network terminals and the network node, and therefore thus not result in unnecessary loads on the network.

A further advantage of the above described invention is that it requires a minimum of effort from the user of the network terminal, since it does not require any additional programs in the network terminal, or any additional installations or re-configurations to be performed by the user.

Further advantageous embodiments of the network node, the method and computer programme product are set forth in the dependent claims, which correspondingly describe further advantageous embodiments of the invention.

BRIEF DESCRIPTION OF THE DRAWINGS

The invention will be described in more detail in the following with reference to the appended drawings, in which:

FIG. 5 is a flowchart illustrating a method according to an exemplary embodiment of the invention.

DETAILED DESCRIPTION

Figure 1:
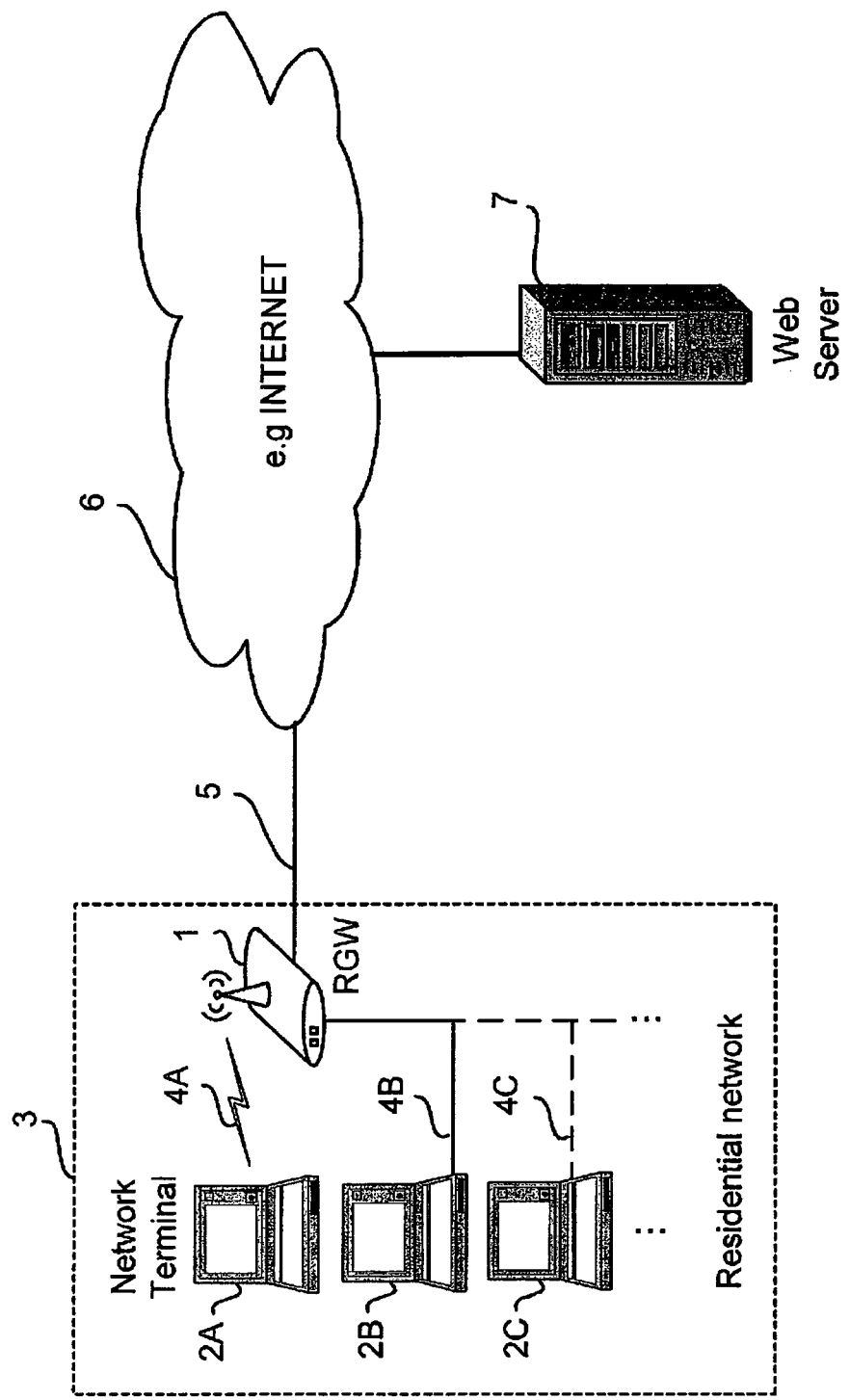
FIG. 1 shows a network node connecting a local network to an external network.

The functionality of the network node according to the invention is most fittingly described in reference to a residential gateway implemented in a residential network, as shown in FIG. 1, but it should be noted that the network node according to the invention may be implemented in or connected to various different types of network environments, such as, for example, company networks, office networks, residential networks, etc. The network node according to the invention may be thus be arranged to provide said local network with an access link to external networks, such as, for example, the Internet or other interconnecting networks.

FIG. 1 shows a residential gateway (RGW) 1 connecting a residential network 3 to an external network 6. In FIG. 1, a residential gateway 1 is located in a residential network 3. The residential gateway 1 may comprise a xDSL or cable modem, or may be arranged between the residential network 3 and a modem (not shown). The modem provides a connection 5 for the residential gateway 1 to an external network 6, e.g. the Internet.

The residential network 3 may comprise at least one network terminal 2A, 2B, 2C. The residential gateway 1 is arranged to communicate with the at least one network terminal 2A, 2B, 2C over at least one connection 4A, 4B, 4C. The at least one connection 4A, 4B, 4C may be a wireless connection 4A (e.g. WiFi) or a physical connection 4B, 4C (e.g. Ethernet cable).

Thus, the residential gateway 1 may provide an access link to the external network 6 for the at least one network terminal 2A, 2B, 2C in the residential network 3 over the connection 5. The external network 6 may comprise or be connected to at least one server, such as, for example, a web server 7. The web server 7 may be arranged to respond to requests according to the request/response standard of the hypertext transfer protocol (HTTP).

A skilled user of the at least one network terminal 2A, 2B, 2C in the residential network 3 may access the web server which is comprised in the residential gateway 1. This may be performed by typing in the numerical IP address of the residential gateway 1 in the address field of a web browser running in the network terminal 2A, 2B, 2C. Usually, the web server contains a HTML page which comprises residential gateway settings and configurations.

However, this requires knowledge about the numerical IP address of the residential gateway, and a general knowledge about how a residential network and a residential gateway operate in order to interpret the settings and configurations. It also requires that the user of the network terminal actively searches for this information. Furthermore, some of the detailed information comprised in the residential gateway 1 may not be available, or is unsuitable to be shown, to the user of the network terminal in this manner, such as, for example, live warnings or error messages. This is because such information is most beneficial to the user if he receives it immediately as it occurs.

According to the inventive features of the invention, these problems are solved by the residential gateway 1 being arranged to transmit a local HTTP responses comprising detailed information to the at least one network terminals 2A, 2B, 2C which may be made using earlier original HTTP requests made by the network terminals 2A, 2B, 2C towards the external network 6.

Figure 2:
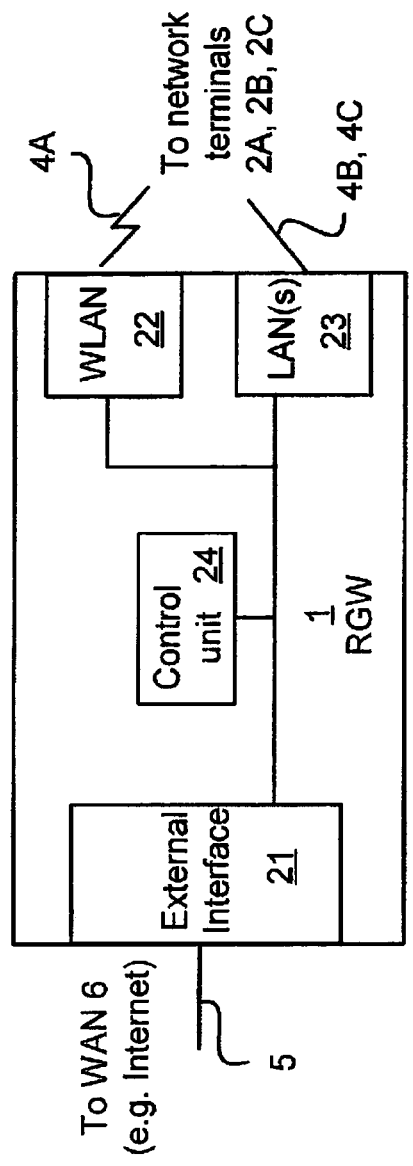
FIG. 2 is a network node according to an embodiment of the invention.

FIG. 2 illustrates a residential gateway 1 according to an embodiment of the invention. The residential gateway 1 comprises an external interface 21 for providing a connection 5 to an external network 6, such as, for example a WAN or the Internet. The external interface 21 may comprise a xDSL or cable modem, or may be arranged to be connected to a external modem (not shown). The external interface 21 may be connected to at least one internal network terminal interface 22, 23 in the residential gateway 1. The at least one internal interface 22, 23 may be, for example, a Wireless-LAN (WLAN) interface 22 for connecting the residential gateway 1 to the at least one network terminals 2A, 2B, 2C over a wireless connection 4A, or a local area network (LAN) interface 23 for connecting the residential gateway 1 to the at least one network terminals 2A, 2B, 2C over a physical connection 4B, 4C. The physical connection 4B, 4C may be established using, for example, an Ethernet cable.

Furthermore, the residential gateway 1 comprises a control unit 24. The control unit 24 may be connected to the external interface 21 and the at least one internal interface 22, 23. The control unit 24 comprises logic for performing the functionality of the residential gateway 1, which may include running a web server or performing a web server functionality arranged to provide detailed information. This functionality may be implemented by means of a software or computer program. The control unit 24 may also comprise storage means or a memory unit for storing the computer program, and processing means or a processing unit, such as a microprocessor, for executing the computer program. When, in the above and in the following, it is described that the residential gateway 1 performs a certain function it is to be understood that the control unit 24 in the residential gateway 1 uses the processing means to execute a certain part of the program which is stored in the storage means.

Figure 3:
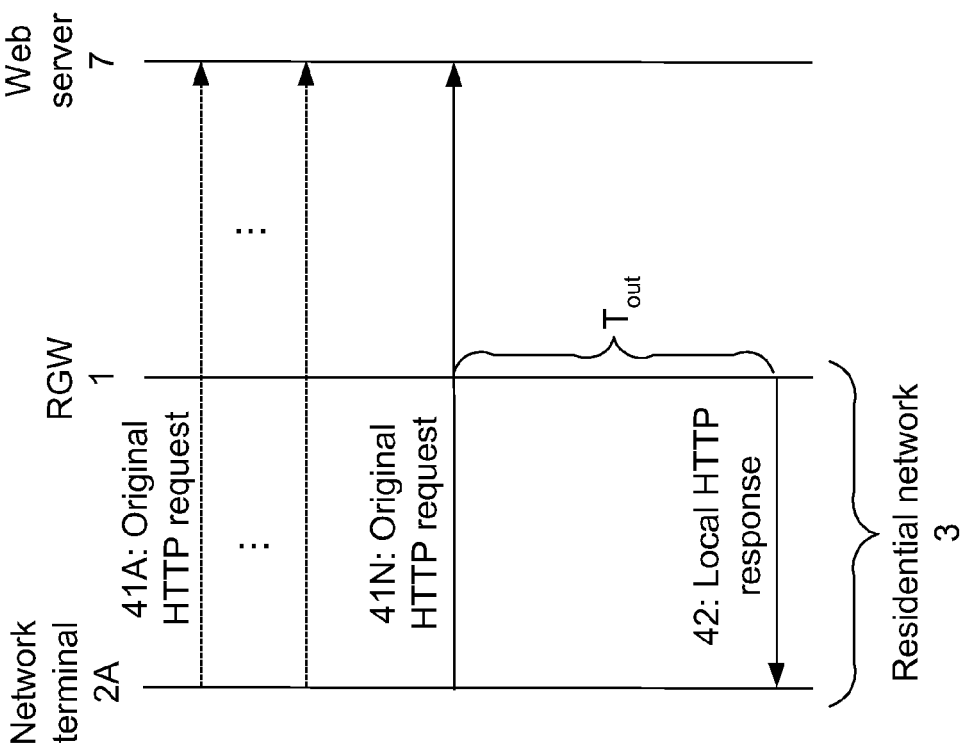
FIG. 3 is a signalling diagram illustrating an exemplary operation of the network node according to an embodiment of the invention.

FIG. 3 is a signalling diagram illustrating an exemplary operation of the residential gateway 1 according to an embodiment of the invention.

In this exemplary operation, a user of the network terminal 2A is currently running a web browser in the network terminal 2A and has generated an original HTTP request 31 to the external web server 7 comprised in or connected to the external network 6. The original HTTP request 31 first passes through the residential gateway 1, which routes the original HTTP request 31 out onto the external network 6 and consequently to the intended web server 7. The web server 7 may upon receiving the original HTTP request 31 respond by returning an original HTTP response 32 according to the request/response standard of the hypertext transfer protocol (HTTP).

If the residential gateway 1 has detected a need to provide some specific type of detailed information to the end user of the network terminal 2A in the residential network 3, it may intercept the original HTTP response 32. This may be performed instead of directly forwarding the original HTTP response 32 from the web server 7 to the network terminal 2A. The specific type of detailed information may be, for example, a gateway status disclosure, live warnings, live messages or error messages, current information about the number of ongoing sessions, information about the current performance of the external network 6, external network diagnostics, new downloadable software, the amount of available memory space in the residential gateway 1 (if such memory devices or hardware are comprised in the residential gateway 1), etc. It should be understood that the examples above are listed for illustrative purposes, and should not be construed as limiting to the invention.

The residential gateway 1 may be arranged to extend the original HTTP response 32 so as to form a local HTTP response 33. The local HTTP response 33 may comprise the entire original HTTP response 32. The extension provided by the residential gateway 1 in the local HTTP response 33 may, for example, be an HTML frame or a banner. Such extensions should preferably be of a type which, when presented to an end user by the web browser in the network terminal 2A, clearly separates the detailed information from the original HTTP response 32. Preferably, the local HTTP response is generated such that it is rendered obvious to the end user of the network terminal 2A that it is the residential gateway 1 that has generated the local HTTP response 33.

Figure 4:
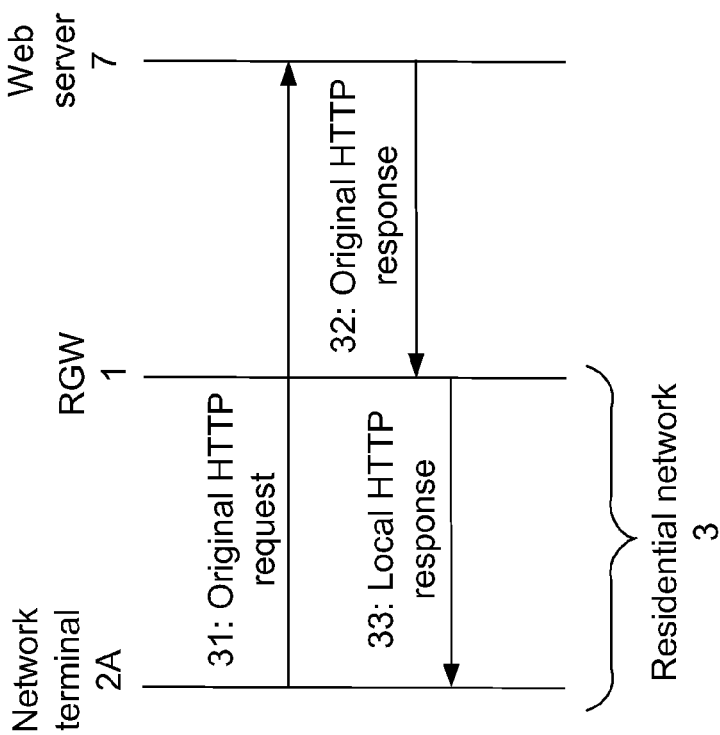
FIG. 4 is signalling diagram illustrating another exemplary operation of the network node according to an embodiment of the invention.

FIG. 4 is signalling diagram illustrating another exemplary operation of the residential gateway 1 according to an embodiment of the invention.

In this exemplary operation, a user of the network terminal 2A is currently running a web browser in the network terminal 2A and has generated at least one original HTTP request 41A-41N to external web servers 7 comprised in or connected to the external network 6. The at least one original HTTP request 41A-41N first passes through the residential gateway 1, which routes the original HTTP request 41A-41N out onto the external network 6 and consequently to the intended web servers 7.

If the residential gateway 1 has detected a need to provide some specific type of detailed information to the end user of the network terminal 2A in the residential network 3, it may generate its own local HTTP response 42. The specific type of detailed information may be any of the above mentioned types described in reference to the previous embodiment. However, in order for the web browser in the network terminal 2A to show the local HTTP response 42, the TCP/IP layers of the network terminal 2A have to accept the local HTTP response 42. This requires that the local HTTP response 42 is generated such that the contents of the TCP/IP headers in the local HTTP response 42 are such that the TCP/IP layers of the network terminal 2A accepts said local HTTP response 42.

In order to achieve a TCP/IP layer acceptable local HTTP response 42, the residential gateway 1 may, for example, monitor and cache at least one of the original HTTP requests 41A-41N. In this way, the residential gateway 1 is able to forge the contents of the TCP/IP headers in the generated local HTTP response 42 such that the TCP/IP layers of the network terminal 2A accepts the generated local HTTP response 42. That is, the residential gateway 1 may generate a local HTTP response 42 with a TCP/IP header which makes the TCP/IP layers of the network terminal 2A believe that the local HTTP response 42 is an original HTTP response from a web server 7 to which the at least one original HTTP request 41A-41N was sent.

The generated local HTTP response 42 provided by the residential gateway 1 may, for example, be a HTML page, a HTML frame or a banner. Such generated local HTTP responses 42 should preferably be of a type which, when presented to an end user by the web browser in the network terminal 2A, renders it obvious to the end user of the network terminal 2A that it is the residential gateway 1 that has generated the local HTTP response 42.

This alternative embodiment may be particularly applicable when, for example, a timing expiry of an original HTTP request 41A-41N to a web server 7 has been detected, e.g. $T_{out}$ has been reached. The residential gateway 1 may then indicate to the end user of the network terminal 2A that the original HTTP response 41A-41N has timed out. This may be performed by, for example, the generated local HTTP response 42 comprising an error message, such as, "No response received from the intended web server" or "Error in the external link to the Internet". These types of messages, made available by the invention, allow greater information dissemination from the residential gateway 1 to the end user of the network terminal 2A.

It should also be noted that the residential gateway 2A may select some cached original HTTP requests 41A-41N that can safely be assumed to be outdated. This may be performed in order to minimize the risk of confusing the web browser and the network terminal 2A by sending a generated local HTTP response 42, when an original HTTP response has been sent but not yet arrived at the residential gateway 1.

Furthermore, a residential gateway 1 according to the invention may in its generated or extended local HTTP response 33, 42 also include a link, button or other programmed web object which leads to the IP address of the residential gateway 1. Thus, the user of the network terminal 2A does not have to enter the numerical IP address of the residential gateway 1 in the address field of the web browser in order to see the configurations and settings of the residential gateway 1. Instead, the user of the network terminal 2A may simply click on the link displayed by the generated or extended local HTTP response 33, 42 in the web browser.

FIG. 5 is a flowchart illustrating a method according to an exemplary embodiment of the invention.

In step S51, the residential gateway 1 monitors and caches original HTTP requests 31, 41A-41N. This may be performed continuously by the residential gateway 1, or for a predetermined period of time after the residential gateway 1 has, in step 52, detected a need to provide some specific type of detailed information to the end user of the network terminal 2A, 2B, 2C in the residential network 3. It follows that step S51 and step S52 may be interchangeable.

In step S53, the residential gateway 1 may determine if the time, $T_{out}$, for an original HTTP response 42 from a web server 7 has expired or timed out. If a timing expiry has been detected, the residential gateway 1 may in step S57 generate a local HTTP response 42. This may be performed by forging the contents of the TCP/IP headers in the local HTTP response 42 such that the TCP/IP layers in the network terminal 2A, 2B, 2C accept the local HTTP response 42. The detailed information may then be included in the local HTTP response 42.

If a timing expiry has not been detected, the residential gateway 1 may in step S54 intercept an original HTTP response 32. In step S55, the residential gateway 1 may extend the original HTTP response 32 so as to create a local HTTP response 33. The local HTTP response 33 may comprise the entire original HTTP response 32 and the detailed information. In step S56, the residential gateway 1 may then transmit the generated or extended local HTTP response 33, 42 to a network terminal 2A, 2B, 2C in the residential network 3.

It should be noted that although the detailed information is described above as general gateway information, the detailed information in all of the embodiments described above may also comprise external information. This external information may, for example, be provided to the residential gateway 1 according to the following.

Logic for performing the functionality of the residential gateway 1 located in the control unit 24, which may include running a web server or performing a web server functionality arranged to provide the detailed information, may also comprise a client functionality. This client functionality may also comprise a web server functionality and be implemented by means of a software or computer program. This software or computer program may, for example, be downloaded to the control unit 24 in the residential gateway 1 over an external network 6. This may, for example, be performed manually by running a program in a computing terminal arranged to communicate over the external network 6, or through a program running in a web server 7 connected to the external network 6. The software or computer program may also already be installed in the control unit 24, be installed by a user from a network terminal 2A, 2B, 2C, or be performed by a dedicated hardware arranged in the control unit 24. The control unit 24 may also store the computer program in a storage means or memory unit, and execute said computer program in a processing means or processing unit. The client functionality in the control unit 24 may, for example, be arranged to continuously listen to web traffic and/or a particular port in the residential gateway 1 in order to be able to receive messages comprising external information from, for example, an external program running in a web server 7 in an external network 6 or from any computing unit connected to the external network 6 or the like.

One illustrative example may be an external mail server arranged to communicate with or connected to a mail client software in the control unit 24 in the residential gateway 1 over the external network 6. The control unit 24 may have the mail client software stored and be arranged to execute the mail client software. By executing the mail client software, the control unit 24 may be arranged to, for example, receive information from the external mail server indicating that the external mail server has received an email. The control unit 24 may then be arranged to provide a user of a network terminal 2A,2B, 2C with said information according to the invention as described in any of the embodiments above. The external mail server may also be, for example, a chat or instant messaging application or the like, with a corresponding chat or instant messaging client software or the like.

Alternatively, an external web server or computer station may be equipped with an alarm software, which may be arranged to communicate with or be connected to an alarm client in the control unit 24 in the residential gateway 1. The alarm client may, when executed in the control unit 24, be arranged to receive alarm signals from the external web server or computer station which indicates alarm information, for example, "The fire alarm at your house has been triggered.", "The burglar alarm at your country house has been triggered." or similar indicative warnings. The control unit 24 in the residential gateway 1 may then be arranged to provide a user of a network terminal 2A,2B, 2C with said information according to the invention as described in any of the embodiments above.

Another illustrative example is where an Internet Service Provider (ISP) may which to open up a direct communication channel with a user of a network terminal 2A,2B, 2C in order to convey important network information. The ISP may provide the control unit 24 in the residential gateway 1 with a notification client, either by downloading or by having it pre-installed in the control unit 24. The notification client may, when executed in the control unit 24, be arranged to receive messages from the external web server or computer station indicating said network information. The control unit 24 in the residential gateway 1 may then be arranged to provide a user of a network terminal 2A,2B, 2C with said information according to the invention as described in any of the embodiments above.

The description above is of the best mode presently contemplated for practising the invention. The description is not intended to be taken in a limiting sense, but is made merely for the purpose of describing the general principles of the invention. The scope of the invention should only be ascertained with reference to the issued claims.

The invention claimed is:

1. A network node arranged to provide a network terminal in a local network with an access link to an external network, said network node being arranged to be connected between said local network and said external network, said network node comprises
a control unit arranged to transmit a local hypertext transfer protocol (HTTP) response, said local hypertext transfer protocol response comprising general network node information or external information provided to the network node from the external network, to at least one network terminal in said local network based on an earlier original HTTP request towards said external network made by said at least one network terminal in the local network, wherein the control unit is further arranged to generate said local HTTP response comprising said information such that it is rendered obvious to the end user that it is said network node that has generated the local HTTP response.

2. A network node according to claim 1, wherein said control unit is further arranged to generate said local HTTP response in response to detecting information indicating a need to provide said information to an end user of a network terminal in the local network.

3. A network node according to claim 2, wherein said control unit is further arranged to detect a need to provide said information by the timing expiry of an original HTTP response from an external web server, and said information comprises information to the end user indicating that said original HTTP response has timed out.

4. A network node according to claim 2, wherein said control unit is further arranged to generate said local HTTP response such that the contents of the TCP/IP headers in said local HTTP response are such that the TCP/IP layers of said network terminals accepts said local HTTP response.

5. A network node according to claim 1, wherein said control unit is further arranged to monitor and cache at least one original HTTP request in order to be able to forge the contents of the TCP/IP headers in said local HTTP response such that the TCP/IP layers on said network terminals accept said local HTTP response.

6. A network node according to claim 1, wherein said control unit is further arranged to:
intercept an original HTTP response from an external web server to said earlier original HTTP request made by at least one of said network terminals in the local network; and
extend said original HTTP response so as to form said local HTTP response.

7. A network node according to claim 6, wherein the control unit is further arranged to perform said intercept in response to a detected need to provide said information to an end user of a network terminal in the local network.

8. A network node according to claim 6, wherein the control unit is further arranged to extend said original HTTP response by an HTML frame or banner when creating said local HTTP response, such that said local HTTP response when presented, by a web browser in said networks terminals, to an end user clearly separates said original HTTP response from the information provided by the network node.

9. A network node according to claim 1, wherein said network node is a residential gateway and said local network is a residential network.

10. A method for use in a network node providing a network terminal in a local network with an access link to an external network said network node is arranged to be connected between said local network and said external network, the method comprising the steps of:
transmitting a local hypertext transfer protocol (HTTP) response, said local hypertext transfer protocol response comprising general network node information or external information provided to the network node from the external network, to at least one network terminal in said local network based on an earlier original HTTP request towards said external network made by said at least one network terminal in the local network;
generating said local HTTP response in response to detecting information indicating a need to provide said information to an end user of a network terminal in the local network; and
detecting a need to provide said information by a timing expiry of an original HTTP response from an external web server.

11. A method according to claim 10, further comprising the steps of:
monitoring and caching at least one original HTTP request;
forging the contents of the TCP/IP headers in said local HTTP response such that the TCP/IP layers on said network terminals accepts said local HTTP response.

12. A method according to claim 10, further comprising the steps of:
intercepting an original HTTP response from an external web server to said earlier original HTTP request made by at least one of said network terminals in the local network; and
extending said original HTTP response so as to form said local HTTP response.

13. A method according to claim 12, further comprising the steps of:
performing said intercept in response to detecting a need to provide said information to an end user of a network terminal in the local network.

14. A network node arranged to provide at least one network terminal in a local network with an access link to an external network, said network node comprising:
at least one microprocessor; and
a non-transitory computer-readable storage medium including computer-readable instructions, when executed by the at least one microprocessor, are configured to:
receive a first hypertext transfer protocol (HTTP) request from the at least one network terminal, and
responsive to receiving the first HTTP request, transmit a local HTTP response to the at least one network terminal, wherein
the local HTTP response comprises
external information provided to the network node from the external network, and
general network node information,
the external information is provided by the external network in response to the first HTTP request.

15. A network node arranged to provide at least one network terminal in a local network with an access link to an external network, said network node comprising:
at least one microprocessor; and
a non-transitory computer-readable storage medium including computer-readable instructions, when executed by the at least one microprocessor, are configured to:
receive a first hypertext transfer protocol (HTTP) request from the at least one network terminal, and
response to receiving the first HTTP request, transmit a local HTTP response to the at least one network terminal, wherein
the local HTTP response comprises
external information provided to the network node from the external network, and
general network node information,
the external information is provided by the external network in response to a second HTTP request, and the second HTTP request was sent prior to the first HTTP request.

* * * * *